(12) United States Patent
Paradkar

(10) Patent No.: US 7,165,194 B2
(45) Date of Patent: Jan. 16, 2007

(54) TECHNICAL SUPPORT FOR SOFTWARE PRODUCTS

(75) Inventor: Mahesh S. Paradkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/314,925

(22) Filed: Dec. 9, 2002

(65) Prior Publication Data

US 2004/0153764 A1 Aug. 5, 2004

(51) Int. Cl.
G06F 11/00 (2006.01)

(52) U.S. Cl. ...................................... 714/57
(58) Field of Classification Search .................. 714/27, 714/38, 46, 32, 49, 20; 717/170; 715/709
See application file for complete search history.

(56) References Cited

U.S. PATENT DOCUMENTS

| | | | |
|---|---|---|---|
| 4,654,852 A | 3/1987 | Bentley et al. ............... 371/29 |
| 5,287,505 A | 2/1994 | Calvert et al. ............... 395/600 |
| 5,367,667 A | 11/1994 | Wahlquist et al. ........... 395/575 |
| 5,678,002 A | 10/1997 | Fawcett et al. ......... 395/183.01 |
| 5,758,071 A | 5/1998 | Burgess et al. ........... 395/200.5 |
| 6,023,507 A * | 2/2000 | Wookey ...................... 709/224 |
| 6,065,136 A * | 5/2000 | Kuwabara ..................... 714/31 |
| 6,298,457 B1 | 10/2001 | Rachlin et al. ............... 714/49 |
| 6,601,190 B1 * | 7/2003 | Meyer et al. .................. 714/37 |

* cited by examiner

*Primary Examiner*—Robert Beausoliel
*Assistant Examiner*—Amine Riad
(74) *Attorney, Agent, or Firm*—Anthony V. S. England; T. Rao Coca

(57) ABSTRACT

A computer software program is used to capture configuration values of predetermined parameters of vendor software and an operating system on which the vendor software is installed. Configuration values of predetermined parameters can be collected from more than one computer in a networked environment. A collated report of configuration values from the customer computer systems is sent to the vendor for diagnosis of the technical problem experienced by the customer.

12 Claims, 8 Drawing Sheets

TECHNICAL SUPPORT FOR SOFTWARE PRODUCTS

FIELD OF THE INVENTION

The present invention relates to providing technical support to customers of software products.

BACKGROUND

When a customer reports a software-related problem to a vendor, the vendor's support person desirably understands the "user environment", namely the relevant software/hardware environment in which the software product operates.

Typically, the user environment is described in part when the customer (that is, the user) reports a problem to the vendor. When reporting the problem, the customer may not have an understanding of the configuration of the user environment that is sufficient to assist a support person to diagnose the technical problem reported by the customer.

Typically, the customer's problem is recorded in a Problem Management System. The support person then solicits relevant information from the customer via telephone, email or other contact with the customer.

If the customer is suitably skilled, the customer may be able to provide the support person with all relevant information. In such cases, the problem can be readily resolved in most cases.

In some cases, information required to identify and/or resolve the problem may reside in the user environment in a form that is not readily accessible or retrievable by the customer. In such situations, the support person diagnosing the problem may provide to the customer programs or scripts that capture the relevant information on the affected systems.

The customer runs the relevant programs or scripts on the customer's systems and a report is then sent back to the support person, or logged in a Problem Management System.

The support person may spend a considerable amount of time understanding the user environment. Understanding the user environment can be particularly difficult for complex environments. For example, middleware products (such as IBM Websphere™, Lotus Notes™, Mqseries™ and DB2™ products) may operate in a distributed environment, with third party applications running on different platforms and/or operating systems. Typically, a number of different software versions are present. With increasing numbers of software products and release versions, helping the customer to manage their configurations can be particularly difficult for the vendor.

Complexity of the sort involved in providing technical support can be difficult to administer. Some published approaches are noted below.

U.S. Pat. No 4,654,852 issued Mar. 31, 1987 to Bentley, et al describes a data-processing subsystem that diagnoses problems in a subsystem, by sensing the configuration of the subsystem. The described system is not used, however, for remote diagnostics.

U.S. Pat. No 5,287,505 issued Feb. 15, 2002 to Calvert et al describes automated problem analysis and resolution of problems relating to customer data-processing systems. A service system orders repair modules, and electronically communicates software fixes to the customer system.

U.S. Pat. No 5,367,667 issued Nov. 22, 2002 to Wahlquist et al describes performing remote diagnostics upon a personal computer system, when a user calls a help line. A computerized case file is created, which includes information about the user's system.

U.S. Pat. No 5,678,002 issued Oct. 14, 1997 to Fawcett et al similarly describes an automated system for diagnosing and resolving computer-related problems from a product support centre.

U.S. Pat. No 5,758,071 issued May 26, 1998 to Burgess et al describes tracking the configuration of a computer coupled to a computer network. This configuration data is repeatedly obtained, and logged to a configuration database.

U.S. Pat. No 6,298,457 issued Oct. 2, 2001 to Rachlin et al describes capturing a description of an "operating domain" and transmitting this description to a software support centre. The operating environment is captured in sufficient detail to allow the problem experienced by the user to be recreated by service representatives.

The above-mentioned references, though useful contributions to the art, are not universal solutions to the complicated issue of providing accurate, efficient and timely technical support to end users of computer software products. Accordingly, in view of the above observations, a need clearly exists for an improved method of providing technical support.

SUMMARY

A single computer software program is advantageously used to capture the user environment for improving the quality of technical support for vendor software. Parameters associated with installed vendor software are collected. The software program is desirably provided in the Java™ or Perl programming languages, or in another relatively "platform independent" programming language.

The techniques described herein for capturing configuration parameters of a user environment involve the use of the configuration capture program to collect records of configuration values from multiple computer systems. The configuration capture program is executed are a first computer system, and then at further computer systems. Separate records of configuration values are sent from each of these further computer systems back to the first computer system. A combined record is then transmitted from the first computer system (for example, by email), to assist in diagnosing a technical problem.

The configuration capture program captures the configuration of the user environment, including:

1. system configuration; and
2. installed software parameters and environment variables that provide the support person with a clear picture of the user environment.

Distinct features of the techniques described herein for recording configuration parameters are:

1. The software system captures the configuration of the systems in the user environment for all the software supported by the vendor.
2. The configuration capture program provided by the vendor can be continuously upgraded to ensure that the program captures the configuration of any upgrades or new releases of the software products supported by the vendor.

With each new release of an operating system or vendor software, any changes to the user environment are determined, and recorded in a table that indicates configuration values of all relevant parameters of the operating system or vendor software.

DETAILED DESCRIPTION

A method, system and computer software for capturing the configuration in the user environment are described in the context of a support person providing technical support to a user of a particular software product. A computer software program assists the support person to appropriately resolve a problem reported by the user. This software program is referred to herein as the configuration capture program, or the ccapture program.

Figure 1:
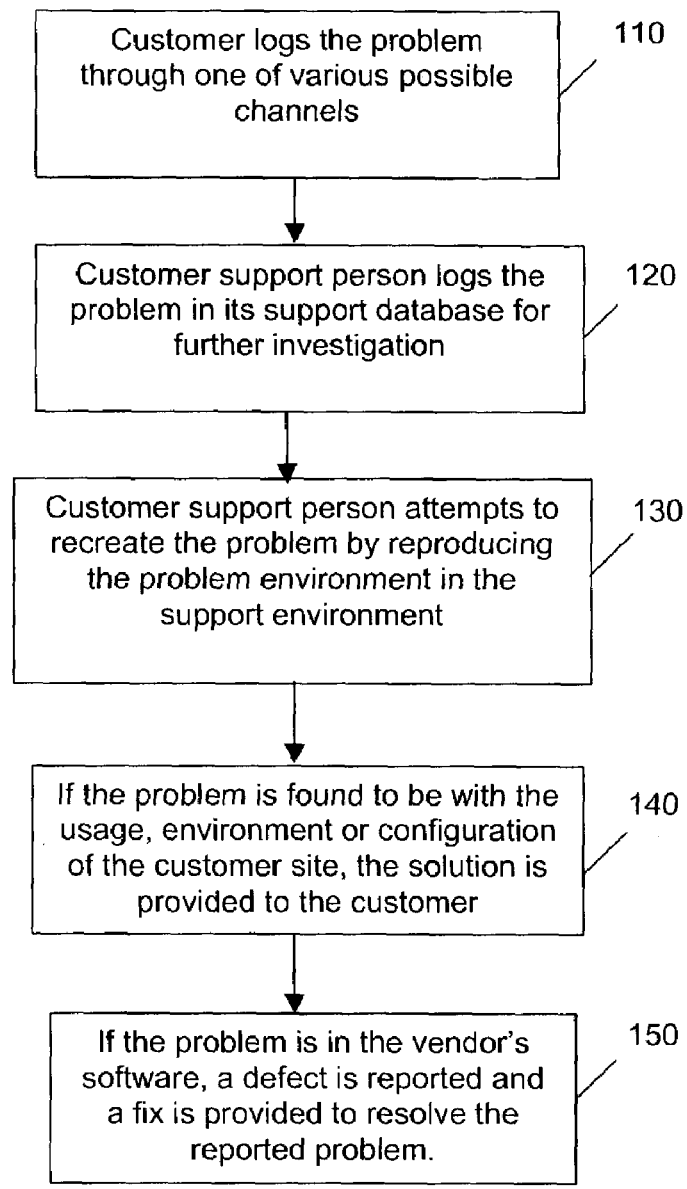
FIG. 1 is a flowchart of steps that occur in a typical example of a customer reporting a technical problem associated with a computer software program.

FIG. 1 represents steps that typically occur when a customer reports a technical problem to a vendor. In step 110, the customer logs or reports the problem using one of a number of possible channels (for example, telephone or email). In step 120, a customer support person at the vendor records the reported problem in its support database for further investigation. In step 130, the customer support person attempts to recreate the problem by reproducing the problem environment (that is, the environment reported by the customer) in the support environment (that is, the environment recreated by the customer support person). In step 140, an appropriate solution is provided to the customer if the customer's problem relates to the manner in which the customer is using the vendor's software. In step 150, a defect is reported and a fix is provided to the customer, if the customer's problem is found to relate to a bug in the vendor's software.

Capturing Configuration Information—Program Flow

Figure 2:
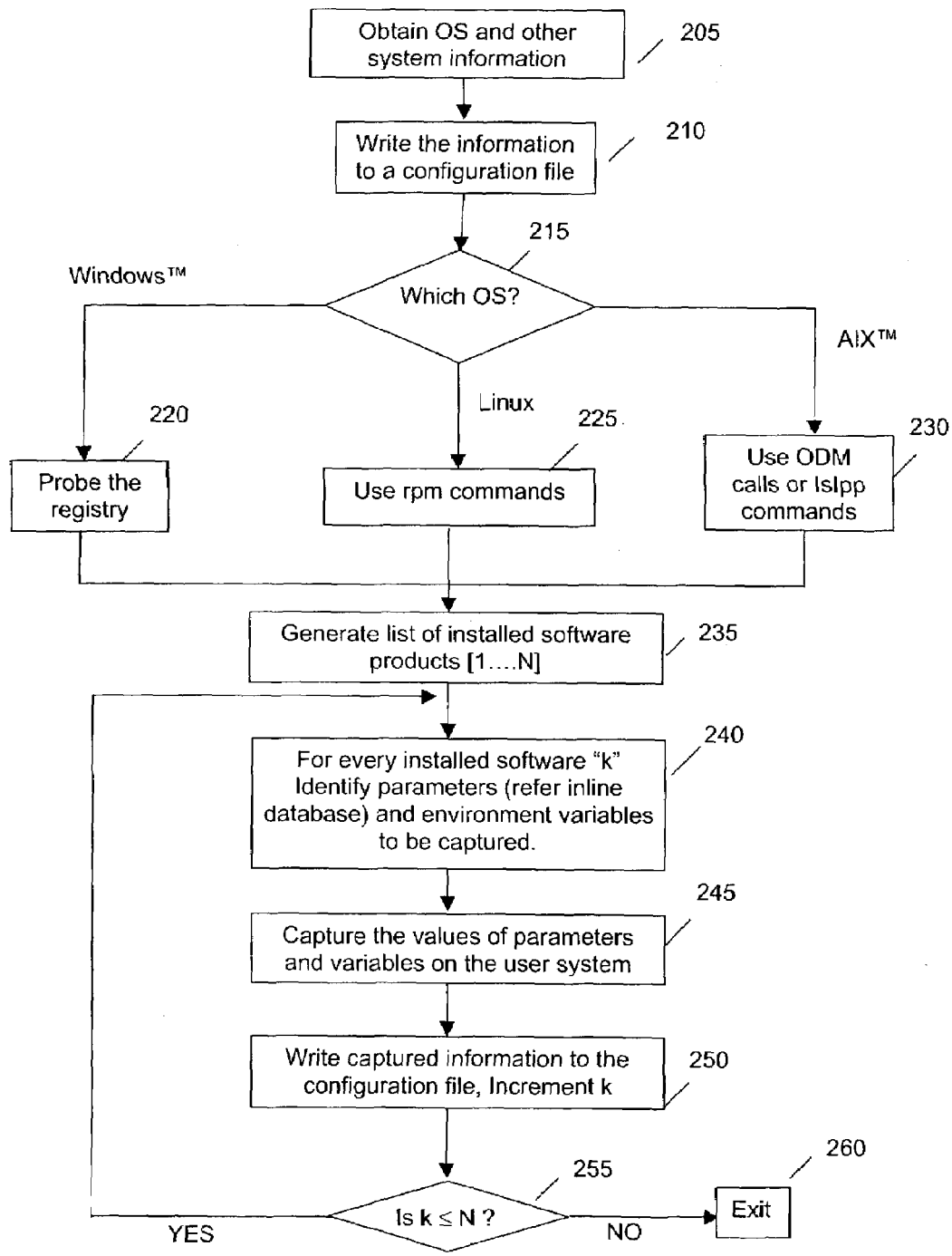
FIG. 2 is a flowchart of steps involved in executing the configuration capture program that is executed on a system at the customer's site.

FIG. 2 represents steps that are performed while executing the configuration capture program. The numbered steps indicated in FIG. 2 are each described below.

Steps 205 and 210 The operating system and release version running on the machine is obtained, together with other relevant details such as system configuration for memory, file systems, model names and numbers etc.

Steps 220 to 235 The list of software installed on the system is generated in step 235. The installed operating system determines the way in which this list is generated. The rpm command is used in Linux, 1slpp or ODM calls are used in AIX™, and the registry is probed in Windows™ operating systems. Other operating systems are appropriately interrogated as required.

Step 240 The parameters associated with each software product installed on the relevant system are obtained. For example, if a Lotus Notes™ client is installed on the system, get the list of parameters to be collected from an inline database and parse the notes.ini file to determine the corresponding values of these parameters.

Step 245 A similar capture of parameters and their values is performed for the other software installed on the system.

Step 250 The results can be captured in a file named after the <nodename>.cfg. An example of the contents of a configuration information file (referred to herein as "nodename.cfg") is provided by Table 1.

Step 300 and 310 Steps 240 to 250 are repeated for each installed software product. This process is exited once completed.

TABLE 1

```
<start>
nodename=islnotesserv
ipaddr=9.184.196.6
osname=aix
osversion=4.3.3
modelname
7044P 270
memory
.
.
filesystems
.
.
<software>
name=notes client
Version=5.0
.
Directory=/notesR4
SETUPDB=setup.nsf
KeyFilename=server.id
EnableJavaApplets=1
..
<software>
name=Netfinity
Version=5.10
.
.
<software>
name=Lotus Smartsuite
Version=97 Edition
.
```

Propagation and Remote Execution

In the Unix environment, propagation and remote execution of the configuration capture program is achieved using the rexec command, subject to following two conditions:

1. The rexecd daemon is running on all the remote machines to which the configuration capture program is propagated.
2. Access and permissions are appropriately set (using .netrc) across all applicable systems to support remote execution of the configuration capture program.

Alternatively, network administration software (for example, Tivoli™ software) can run the configuration capture program, or a command of the configuration capture program, on all the remote systems that the administration software administers. Accordingly, the network administration software handles the required propagation and remote execution of the configuration capture program.

Systems present in networked environments usually have security measures in place to prevent inappropriate access from other systems. In particular, these security measures usually prevent remote systems from invoking or executing a program that may be present, or which may have been transferred from the remote system. However, the situation may differ in trusted environments and a system may grant access to remote systems to thereby allow remote systems to transfer files or invoke programs. The propagation of the computer software program through a networked environment (for example, via the Internet) and subsequent execution is subject to such means made available in the environment to support remote execution of the programs.

If suitable network administration software is not available, the customer can "manually" run the program or script on each system, and consolidate individual node configuration information for use by the customer support person.

Figure 3:
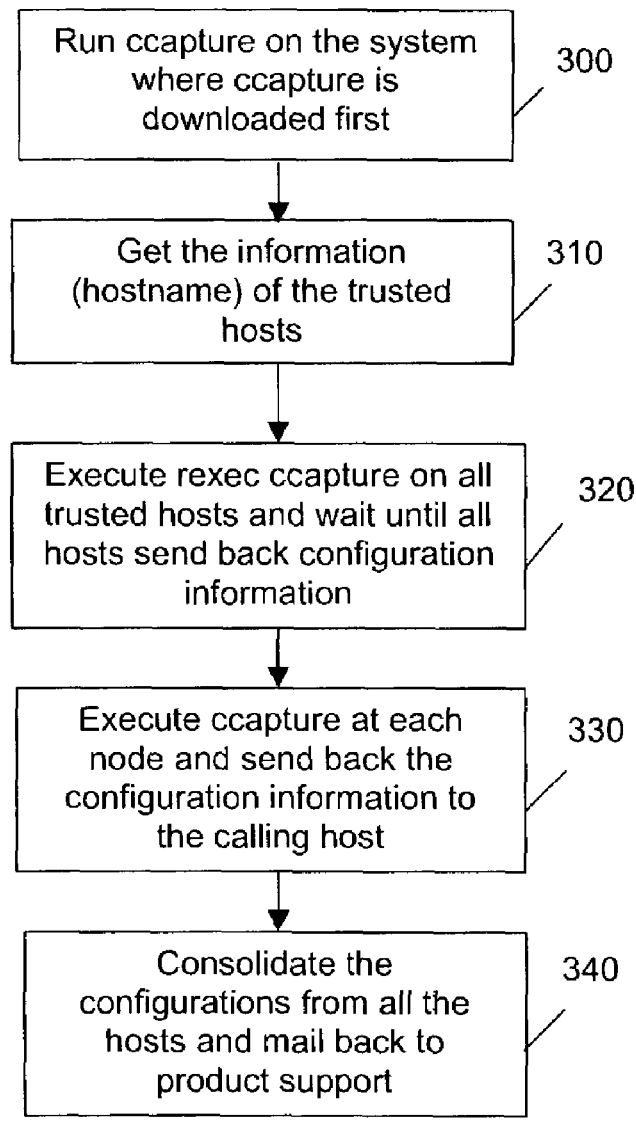
FIG. 3 is a flowchart of the steps involved in the propagation and remote execution of the configuration capture program over the distributed environment at the customer site.

FIG. 3 represents steps that are performed in relation to use of the configuration capture program to assist in processing customer problems. Each of the numbered steps indicated in FIG. 3 is described directly below.

Step 300 The ccapture program is first executed on the local machine, where the program captures the configuration of the local machine.

Step 310 The information (hostname) of the trusted hosts in the network is obtained from .netrc file on the system.

Step 320 rexec (UNIX) is called with ccapture as the option on each of the trusted hosts identified in step 310 above. The ccapture program waits until all hosts send back the requested configuration information (in the file nodename.cfg).

Step 330 rexec causes the ccapture program to execute on each of the hosts. The configuration of each host is captured in a nodename.cfg file. Each node then transfers this file back to the node from where the ccapture was rexec-ed (that is, was executed).

Step 340 On receipt of the nodename.cfg file from all the nodes where ccapture was successfully rexec-ed, all the configuration files are collated and sent back to the customer support person via email.

Use of Configuration Capture Program

The configuration capture program is platform independent to allow the configuration capture program to execute without undue difficulty at the customer's site. The configuration capture program initially executes on the system to which the configuration capture program is downloaded. The configuration capture program is then executed by other systems that are networked with the initial system. Every "node" on which the configuration capture program is executed transmits configuration information to the system to which the configuration capture program was initially downloaded and executed.

Accordingly, "node-wise" information is collated and transmitted (by email) to the vendor. This configuration information is accompanied by a problem report prepared by the customer.

Figure 4:
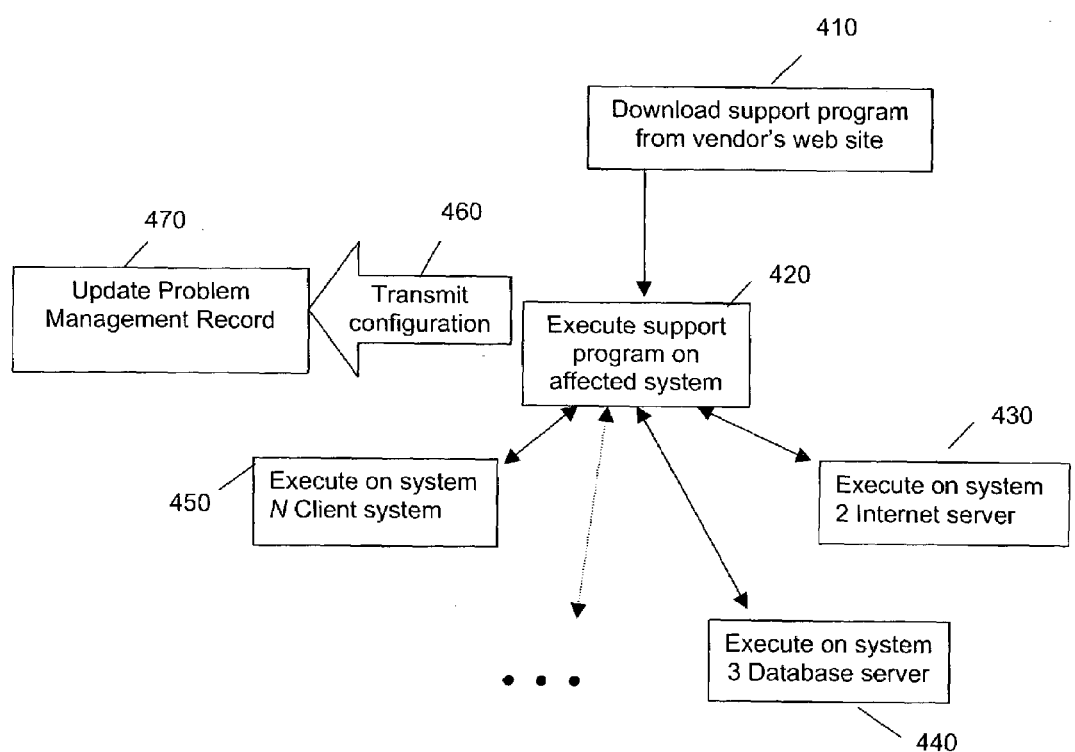
FIG. 4 is a schematic representation of the steps depicted in FIG. 3.

FIG. 4 schematically represents steps involved in downloading and using the configuration capture program. The configuration capture program is downloaded in step 410, over a network, from the vendor. The configuration capture program is downloaded and executed by an affected system in step 420. The configuration capture program is transmitted and executed by other systems in steps 430 to 450 for execution on these respective systems (system 2, 3 ... N) in the manner described above. Once configuration information from each of the systems is collected, this information is collated and transmitted as captured configuration information from the affected system in step 460. The captured configuration information is transmitted in step 460 and is then recorded in a Problem Management Record in step 470. As described, transmission can be via email.

Design and Development of Configuration Capture Program

The design of the configuration capture program and the associated development process is described with reference to FIGS. 5 to 7.

Figure 5:
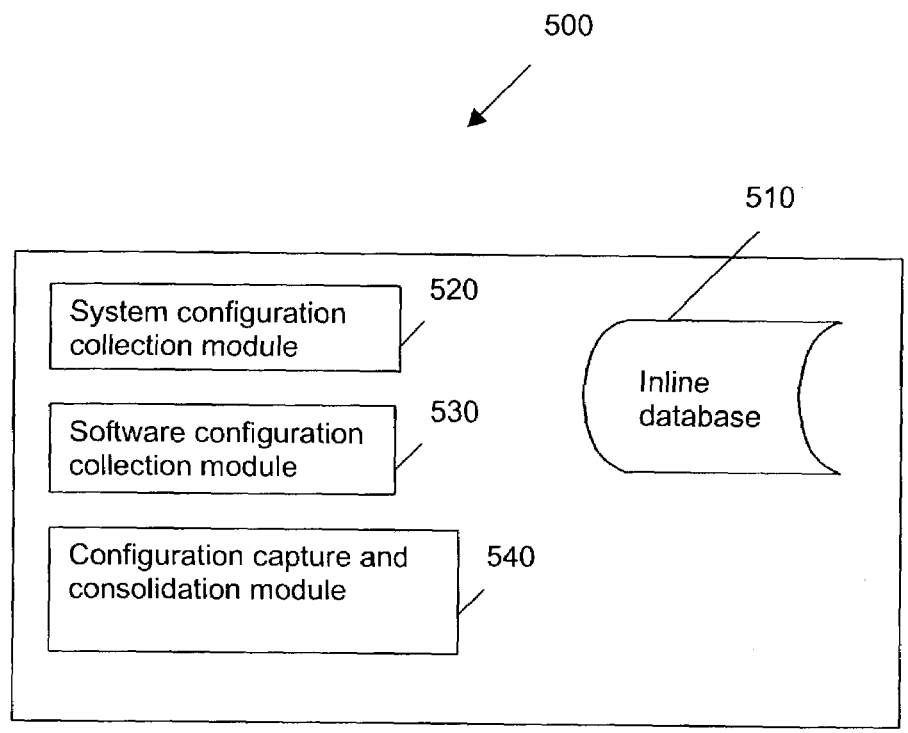
FIG. 5 is a schematic representation of the components of a technical support system that involves the configuration capture program described herein with reference to FIGS. 1 to 4.

FIG. 5 schematically represents different components of the configuration capture program 500. The configuration capture program 500 includes the following components:
1. inline database 510
2. system configuration capture module 520
3. software configuration capture module 530
4. configuration capture and consolidation module 540

Inline Database

The inline database 510 is an exhaustive lookup for the information concerning captured parameters for a given release or version of the operating system and the vendor software.

Table 2 provides an example format of a list of the system parameters to be determined and recorded (in the configuration file, nodename.cfg). The particular parameters of Table 2 that are accessed depends on the operating system on which the configuration capture program is executing, and the release version of that operating system. Similarly, Table 3 provides an example format of a list of the software parameters that are recorded for the vendor software on various operating systems and their release versions.

TABLE 2

| Linux | AIX | Windows |
| --- | --- | --- |
| Version 2.4 | Version 4.3 | Win 95 |
| Parameter 1 | Parameter 1 | Parameter 1 |
| Parameter 2 | Parameter 2 | Parameter 2 |
| . . . | . . . | . . . |
|  |  | Parameter m |
|  |  | Win 98 |
| Parameter m |  | . . . |
| Version 3 |  |  |
| Parameter 1 |  |  |
| Parameter 2 | Parameter k | Win NT |
| . . . | Version 51C | . . . |
|  | . . . |  |
| Parameter m |  |  |

System Configuration Capture Module

The system configuration capture module 520 performs the following functions:
  determining the operating system and the release version running on the system
  obtaining the relevant set of parameters to be recorded from the inline database 510, for the determined operating system and release version
  fetching the values of the obtained parameters and recording these values Software Configuration Collection Module The software configuration collection module 530 performs the following functions:
  determining the vendor software and release version for the operating system and release version running on the system
  obtaining the relevant set of parameters to be recorded from the inline database 510, for the determined vendor software and its release version, and the operating system and its release version fetching the values of the obtained parameters and recording these parameters

TABLE 3

| Software | Linux | AIX | Windows |
|---|---|---|---|
| IBM DB/2 ™ | | | |
| Release 1 | Variables (v1, v2, . . .) | Variables (v1, v2, . . .) | . . . |
| Release 2 | Variables (v1, v2, . . .) | | . . . |
| . . . | | | |
| Upgrade 2 | Variables (v1, v2, . . .) | | . . . |
| Release n | | | |
| Lotus Domino ™ | | | |
| Release 1 | Variables (v1, v2, . . .) | Variables (v1, v2, . . .) | |
| Release 2 | Variables (v1, v2, . . .) | | |
| Upgrade 1 | | | |
| Release n | | | |
| IBM Websphere ™ | Variables (v1, v2, . . .) | Variables (v1, v2, . . .) | |
| Release1 | Variables (v1, v2, . . .) | | |
| Release2 | . . . | . . . | |
| Upgrade N | . . . | . . . | |
| . . . | . . . | | |
| Release n | Variables (v1, v2, . . .) | | Variables (v1, v2, . . .) |

Configuration Capture and Consolidation Module

The configuration capture and consolidation module 540 co-ordinates transferring configuration information between trusted hosts, and performs the following functions:
  determining the trusted hosts on the network
  capturing rexec configuration
  consolidating the captured configuration information from the trusted hosts and transmitting this information to the vendor The implementation language of the configuration capture program supports interaction with the underlying system to extract the parameters of the operating system and the installed software. This implementation language is also, for convenience, desirably platform independent. The Java™ or Perl programming languages are two suitable examples. These languages are platform independent to the extent that the Java™ Runtime Environment in case of Java, and the Perl Interpreter in case of Per, 1 are available on the target platform.

Development Process

Figure 6:
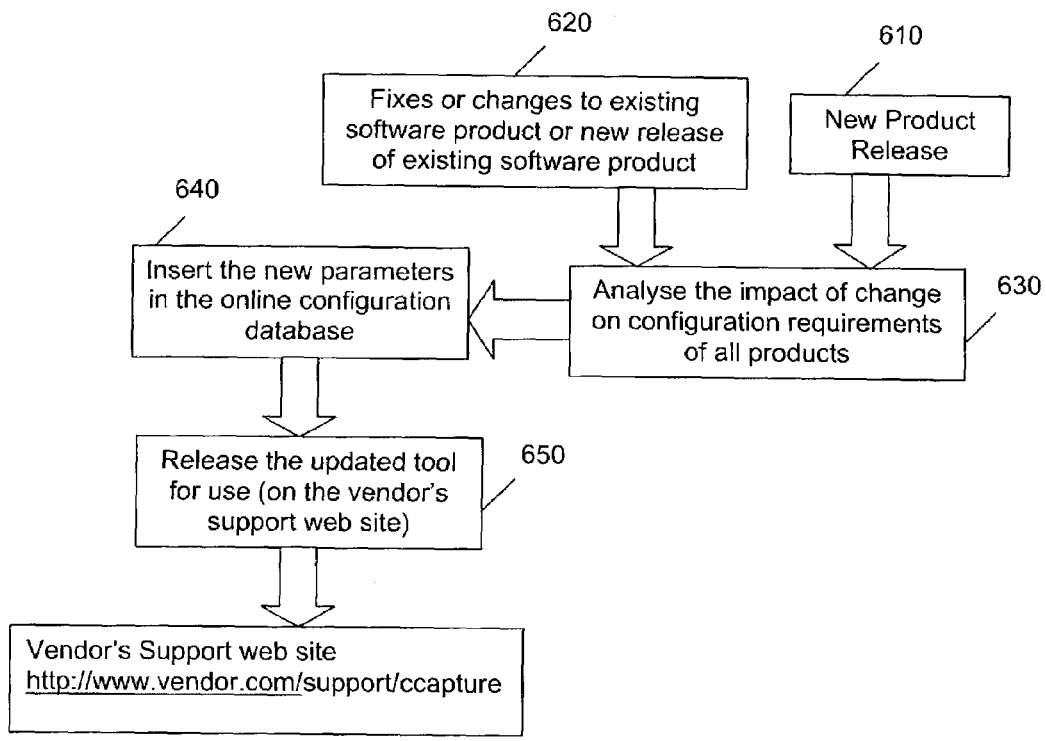
FIG. 6 is a schematic overview of the described process of modifying a configuration capture program in response to new releases or upgrades of vendor software or underlying operating systems.

FIG. 6 schematically represents the steps involved in developing the configuration capture program for use in supporting releases and upgrades of vendor software and/or the customer's underlying operating system. Software vendors typically keep upgrading their software products or introduce new products to the market.

Consequently, if the customer upgrades or installs new products, there may be new configuration parameters/variables, or the existing ones may require changes. Being the solution provider, the vendor is aware of these changes and their impact on the customer's configuration. A lot of problems that are reported after the release of new products/upgrades are caused by configuration changes. Accordingly, all required parameters are desirably updated as soon as the vendor brings out a new product, or an upgrade to an existing product. Updates of this sort can occur as a result of a fix that affects the configuration requirements of the products.

FIG. 6 depicts in overview the described process of modifying the configuration capture program in response to new releases or upgrades of vendor software, or customers' underlying operating systems. New vendor software products 610, or new releases or upgrades of existing vendor software 620 are recorded. Each of these new releases is analyzed in step 630 to determine the impact on the configuration requirements of vendor software. New parameters are included in the online configuration database in step 640, as appropriately determined on the basis of the analysis performed in step 630. An updated support program is released in step 650, including the new parameters specified in step 640. The revised support tool is released to the vendor's web site 660 for general distribution.

Figure 7:
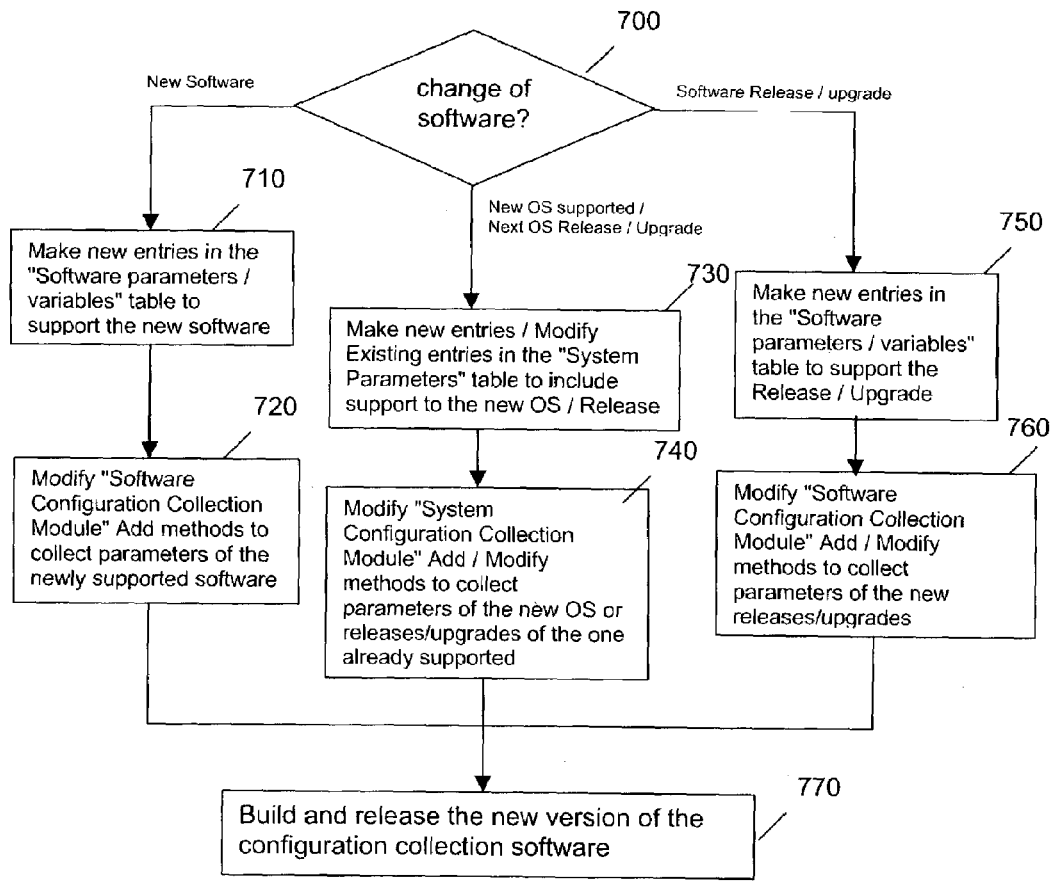
FIG. 7 is a flowchart of steps involved in maintaining the configuration capture tool program described herein with reference to FIGS. 1 to 4.

FIG. 7 represents the steps involved in a change control process for maintaining the ccapture program and the inline database tables.

A change or upgrade to the configuration capture program is initiated whenever any one or more of the following events occur, as determined by decision 700 of FIG. 7:
1. new vendor software is released
2. vendor software is upgraded or a new version is released
3. a new operating system is supported, or a new version or upgrade of the operating system is released.

In the case of events 1 or 2 listed above, appropriate entries in Table 3 are added or modified, in step 710 and step 750 respectively. In step 720 and step 760 respectively, appropriate functionality is added or enhanced in the software configuration collection module 530. These respective steps allow for the capture of new software parameters.

In the case of event 3 listed above, entries in Table 2 are added or modified in step 730. Appropriate functionality is then added or enhanced in the system configuration collection module 520, in step 740. These steps similarly allow for the capture of new system parameters.

After the above-described revisions, the modified support program can be released to a technical support web site, in step 770.

The configuration capture program can be made available to the customer via a web site available to the customer (for example, the vendor's web site). As the newer versions of the software, operating systems, database management systems etc become available, a revised version of the configuration capture program can be released through the web site.

Advantages

There are various advantages associated with use of the support program described herein. These include the advantages listed below.

1. An accurate picture of the customer's environment can be generated, without the possibilities of errors that can be introduced by manually recording customer environment information.
2. The customer need not have a technical background required to collect the configuration information collected by the support person.
3. The support person need not develop tailored scripts each time a reported problem requires understanding of the user environment.
4. A database of customer environments and associated problems can be generated, if the customer reports any problem in the future. This database can be accessed to address reported problems with other customer environments.
5. The support program can programmed to report configuration errors in the customer environment, and suggest possible solutions.

Computer Hardware and Software

Figure 8:
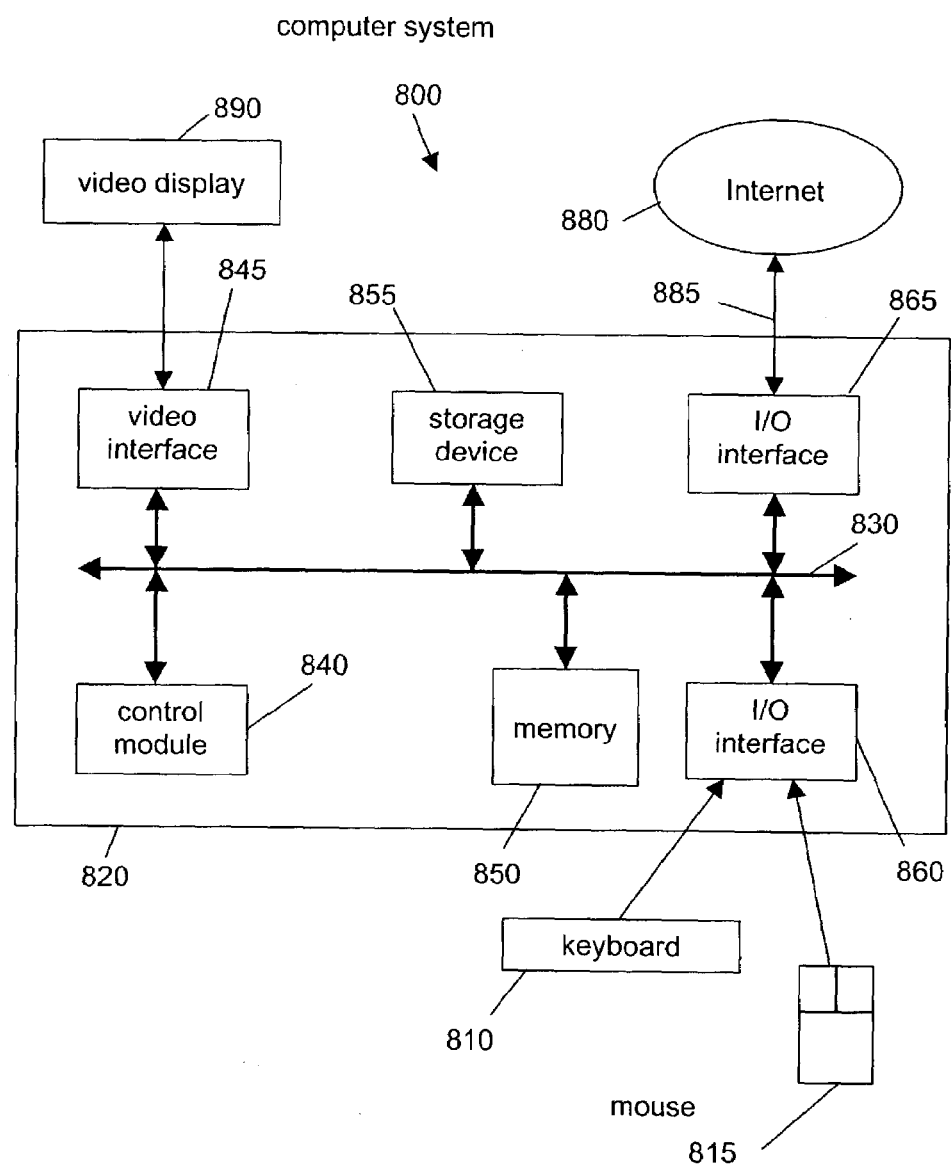
FIG. 8 is a schematic representation of a computer system than can be used to perform steps in a process that implements the techniques described herein with reference to FIGS. 1 to 4.

FIG. 8 is a schematic representation of a computer system 800 that can be used to perform steps in a process that implement the techniques described herein. The computer system 800 is provided for executing computer software that is programmed to assist in performing the described techniques. This computer software executes under a suitable operating system installed on the computer system 800.

The computer software involves a set of programmed logic instructions that are able to be interpreted by the computer system 800 for instructing the computer system 800 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 800 include: a computer 820, input devices 810, 815 and video display 890. The computer 820 includes: processor 840, memory module 850, input/output (I/O) interfaces 860, 865, video interface 845, and storage device 855.

The processor 840 is a central processing unit (CPU) that executes the operating system and the computer software executing under the operating system. The memory module 850 includes random access memory (RAM) and read-only memory (ROM), and is used under direction of the processor 840.

The video interface 845 is connected to video display 890 and provides video signals for display on the video display 890. User input to operate the computer 820 is provided from input devices 810, 815 consisting of keyboard 810 and mouse 815. The storage device 855 can include a disk drive or any other suitable non-volatile storage medium.

Each of the components of the computer 820 is connected to a bus 830 that includes data, address, and control buses, to allow these components to communicate with each other via the bus 830.

The computer system 800 can be connected to one or more other similar computers via a input/output (I/O) interface 865 using a communication channel 885 to a network 880, represented as the Internet.

The computer software program may be provided as a computer program product, and recorded on a portable storage medium. In this case, the computer software program is accessed by the computer system 800 from the storage device 855. Alternatively, the computer software can be accessed directly from the network 880 by the computer 820. In either case, a user can interact with the computer system 800 using the keyboard 810 and mouse 815 to operate the programmed computer software executing on the computer 820.

The computer system 800 is described for illustrative purposes: other configurations or types of computer systems can be equally well used to implement the described techniques. The foregoing is only an example of a particular type of computer system suitable for implementing the described techniques.

CONCLUSION

A method, a system and a computer software program for improving technical support are described herein. Particular advantages of the described techniques include:

1. Reduced turnaround time for resolving user problems: Since the user environment is captured by the described computer software program, the support person and the user do not need to discuss the configuration of the user environment. The configuration is captured in a single step.
2. More reliable information: As the task of configuration information capture is performed by the described computer software tool, there is less possibility of loosing or missing out on reporting any information. This can result in a quick resolution to problems that may arise due to obvious errors in the configuration.
3. Improved user focus: Due to the available database records and/or history of the user environment, the support person is more familiar with the user environment, each time the user reports a problem.
4. Saved time and effort: The support person need not spend time developing custom scripts or programs to capture configuration information.

Various alterations and modifications can be made to the techniques and arrangements described herein, as would be apparent to one skilled in the relevant art.

I claim:

1. A method of capturing a user environment for a computer system, the method comprising the steps of:
    a) executing a configuration capture program on a first computer system, wherein the executing of the configuration capture program includes generating a record for the first computer system, the first computer system record including i) identification of operating system software, system memory configuration, file systems, and model of the first computer system, ii) identification of application software on the first computer system, and iii) configuration values of parameters relating to the identified application software installed on said first computer system, wherein the generating includes:

generating the record of the application software in a predetermined manner responsive to the identified operating system, wherein the parameters are predetermined parameters, the predetermined parameters having identities defined in a database of the configuration capture program and the generating of the record of the configuration values includes:

looking up the identities of the predetermined parameters in the database; and parsing configuration files of the application sofware responsive to the predetermined parameter identities, and wherein the configuration capture program accesses a list of trusted host computer systems operatively connected to the first computer system by a network;

b) initiating, by the first computer system, execution of the configuration capture program on the listed trusted host computer systems, wherein the executing of the configuration capture program on such a trusted host computer system includes generating a record for the trusted host computer system, the trusted host computer system record including i) identification of operating system software, system memory configuration, file systems, and model of the trusted host computer system, ii) identification of application software on the trusted host computer system, and iii) configuration values of parameters relating to the identified application software installed on said trusted host computer system, wherein the generating of the record for the trusted host computer system includes:

generating the record of the trusted host application software in a predetermined manner responsive to the trusted host identified operating system, wherein the trusted host parameters are predetermined parameters, the trusted host predetermined parameters having identities defined in a database of the configuration capture program, and the generating of the record of the configuration values includes:

looking up the identities of the trusted host predetermined parameters in the database; and parsing configuration files of the trusted host application sofware responsive to the predetermined parameter identities, wherein said records of said configuration values generated in step b) are transmitted from the respective trusted host computer systems to said first computer system; and c) transmitting, for receipt by a customer support person, said records generated in steps a) and b) from said first computer system, wherein the records provide the customer support person information about the user environment for the first computer system.

2. The method as claimed in claim 1, further comprising the step of: transmitting the configuration capture program to the first computer system for initiating execution of steps a) through c).

3. The method as claimed in claim 1, wherein said executing of the configuration capture program on such a first computer system or trusted host computer system includes recording parameters of the operating system software of such a computer system.

4. The method as claimed in claim 1, wherein said executing of the configuration capture program on such a first computer system or trusted host computer system includes recording configuration parameters of installed versions of said application software of such a computer system.

5. The method as claimed in claim 1, wherein in step c) the transmitting includes transmitting by electronic mail.

6. A computer program product for capturing a user environment of a computer system, wherein the computer program product resides on a computer usable medium having computer readable program code, the program code comprising:

first instructions for executing a configuration capture program on a first computer system, wherein the configuration capture program generates, for the first computer system, a record, the first computer system record including i) identification of operating system software, system memory configuration, file systems and model of the first computer system, ii) identification of application software on the first computer system, and iii) configuration values of parameters relating to the identified application software installed on said first computer system, wherein the generating includes:

generating the record of the application software in a predetermined manner responsive to the identified operating system, wherein the parameters are predetermined parameters, the predetermined parameters having identities defined in a database of the configuration capture program, and the generating of the record of the configuration values includes:

looking up the identities of the predetermined parameters in the database; and parsing configuration files of the application sofware responsive to the predetermined parameter identities, and wherein the configuration capture program accesses a list of trusted host computer systems operatively connected to the first computer system by a network;

second instructions for initiating, by the first computer system, execution of the configuration capture program on the listed trusted host computer systems, wherein the executing of the configuration capture program on such a trusted host computer system includes generating a record for the trusted host computer system, the trusted host computer system record including i) identification of operating system software, system meory configuration file systems, and model of the trusted host computer system, ii) identification of application software on the trusted host computer system, and iii) configuration values of parameters relating to the identified application software installed on said trusted host computer system, wherein the generating of the record for the trusted host computer system includes:

generating the record of the trusted host application software in a predetermined manner responsive to the trusted host identified operating system, wherein the trusted host parameters are predetermined parameters, the trusted host predetermined parameters having identities defined in a database of the configuration capture program, and the generating of the record of the configuration values includes:

looking up the identities of the trusted host predetermined parameters in the database; and parsing configuration files of the trusted host application sofware responsive to the predetermined parameter identities, wherein said records of said configuration values generated by executing the configuration capture program on the listed trusted host computer systems are transmitted from the respective trusted host computer systems to said first computer system; and third instructions for transmitting said records generated by executing the configuration capture program on the first computer system and the listed trusted host computer systems, wherein the records are transmitted from said first computer system for receipt by a customer support person to provide the customer support person information about the user environment for the first computer system.

7. The computer software program as claimed in claim 6, wherein said executing of the configuration capture program on such a first computer system and such trusted host computer systems includes recording parameters of the operating system software of the respective ones of such computer systems.

8. The computer software program as claimed in claim 6, wherein said executing of the configuration capture program on such a first computer system and such trusted host computer systems includes recording configuration parameters of installed versions of said application software of the respective ones of such computer systems.

9. The computer software program as claimed in claim 6, wherein said fourth instructions include instructions for transmitting by electronic mail.

10. An apparatus for capturing a user environment of a computer system, the apparatus comprising:
   a processor;
   a storage device coupled to the processor and having computer program instructions stored on a computer readable medium of the storage device, wherein the processor is operable wit the computer program instructions to perform the steps of:
   a) executing a configuration capture program on a first computer system, wherein the executing of the configuration capture program includes generating a record for the first computer system, the first computer system record including i) identification of operating system software, system memory confituation, file systems, and model of the first computer system, ii) identification of application software on the first computer system, and iii) configuration values of parameters relating to the identified application software installed on said first computer system, wherein the generating includes:
      generating the record of the application software in a predetermined manner responsive to the identified operating system, wherein the parameters are predetermined parameters, the predetermined parameters having identities defined in a database of the configuration capture program, and the generating of the record of the configuration values includes:
      looking up the identities of the predetermined parameters in the database; and
      parsing configuration files of the application sofware responsive to the predetermined parameter identities, wherein the configuration capture program accesses a list of trusted host computer systems operatively connected to the first computer system by a network;
   b) initiating, by the first computer system, execution of the configuration capture program on the listed trusted host computer systems, wherein the executing of the configuration capture program on such a trusted host computer system includes generating a record for the trusted host computer system, the trusted host computer system record including i) identification of operating system software, system memory configuration, file systems, and model of the trusted host computer system, ii) identification of application software on the trusted host computer system, and iii) configuration values of parameters relating to the identified application software installed on said trusted host computer system, wherein the generating of the record for the trusted host computer system includes:
      generating the record of the trusted host application software in a predetermined manner responsive to the trusted host identified operating system, wherein the trusted host parameters are predetermined parameters, the trusted host predetermined parameters having identities defined in a database of the configuration capture program, and the generating of the record of the configuration values includes:
      looking up the identities of the trusted host predetermined parameters in the database; and
      parsing configuration files of the trusted host application sofware responsive to the predetermined parameter identities, wherein records of said configuration values generated by the execution of the configuration capture program on the listed trusted host computer systems are transmitted from the respective trusted host computer systems to said first computer system; and
   c) transmitting, from said first computer system for receipt by a customer support person, said records generated by executing the configuration capture program on the first computer system and the listed trusted host computer systems, wherein the records provide the customer support person information about the user environment for the first computer system.

11. The apparatus as claimed in claim 10, wherein said executing of the configuration capture program on such a first computer system and such trusted host computer systems includes recording configuration parameters of installed versions of said application software of the respective ones of such computer systems.

12. The apparatus as claimed in claim 10, wherein in step c) the transmitting includes transmitting by electronic mail.

* * * * *